June 13, 1967   H. W. HEADLE, JR   3,325,731
FREQUENCY MEASURING SYSTEM USING FOLDING BANDWIDTHS
Filed July 24, 1964

INVENTOR.
HERBERT W. HEADLE JR.
BY
ATTORNEYS

United States Patent Office 3,325,731
Patented June 13, 1967

3,325,731
FREQUENCY MEASURING SYSTEM USING
FOLDING BANDWIDTHS
Herbert W. Headle, Jr., Rome, N.Y., assignor to the
United States of America as represented by the Secretary of the Air Force
Filed July 24, 1964, Ser. No. 385,093
2 Claims. (Cl. 324—77)

The invention described herein may be manufactured and used by or for the United States Government for governmental purposes without payment to me of any royalty thereon.

This invention relates to a method and system for determining frequency and, more particularly, to determining frequency of radar pulses transmittted within a given bandwidth.

The present invention will allow the frequency of radar type pulse to be measured when the pulse has been received on a wide bandwidth receiver. The intermediate frequency of the receiver is mixed with an oscillator and the mixer output is fed to a band-pass filter which has the effect of folding the band-pass of the receiver and allowing one-half of this band to activate a trigger or voltage sensor. This process can be continued taking smaller and smaller fractions of the band. A binary code can then be read out of the triggers and combined with the local oscillator frequency of the receiver which has also been converted to binary form to give the true radio frequency of the received pulse.

The invention allowing for an accurate frequency measurement of a radio frequency pulse to be made with a wide bandwidth receiver offers the advantage that the time required to measure this frequency is shorter than the pulse width, thereby allowing intermixed pulses to be individually measured. Also, a minimum number of filters are required to perform the required measurements and the output is in binary coded form making it usable for further manipulation.

An object of this invention is therefore to provide a method and system for determining an unknown frequency of a received signal.

Another object is to provide a method and system for detecting the transmitted frequency of radar pulses in a given bandwidth.

It is still another object to provide a method and system for determining the received frequency of radar pulses in a time less than the pulse width.

These and other advantages, features and objects of the invention will become more apparent from the following description taken in connection with the illustrative embodiments in the accompanying drawings, wherein.

Figure 1:
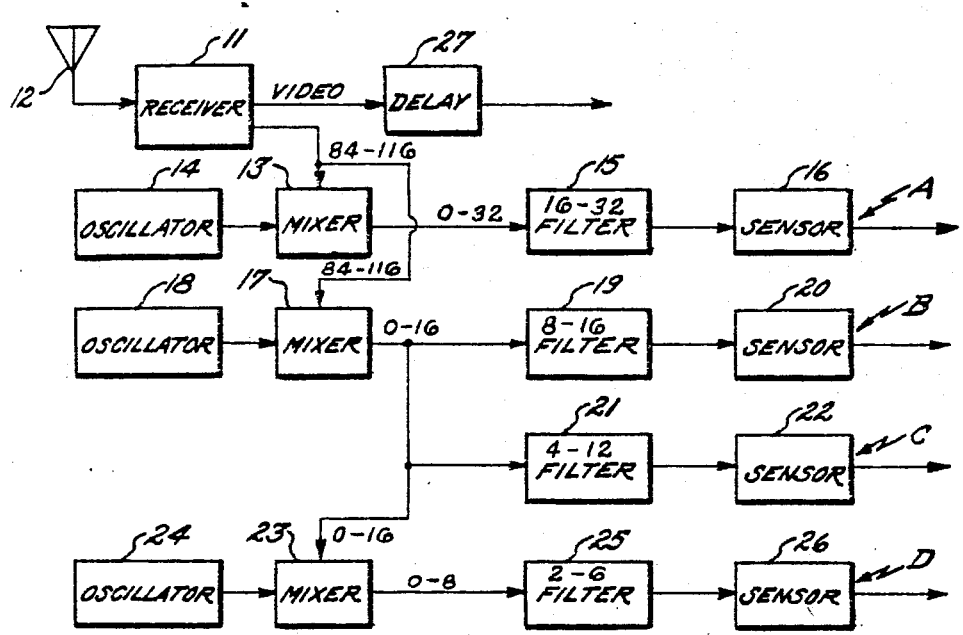
FIGURE 1 shows a block diagram of an embodiment of the invention.

Referring to FIGURE 1, an embodiment of the invention is explained in detail using a receiver having a 32 mc. bandwidth and an intermediate frequency having a center frequency of 100 mc. Oscillators 14, 18 and 24 are used having frequencies of 84 mc., 100 mc. and 8 mc., respectively. The invention, however, is not restricted to these values.

Receiver 11 receives the signal through antenna 12 and converts it to the intermediate frequency which is fed into mixer 13. Oscillator 14 is also fed to mixer 13. The output of mixer 13 is fed to band-pass filter 15, the band of frequencies being a fraction of the intermediate frequency. The output of filter 15 is detected by voltage level sensor 16 which can be a Schmitt trigger. If a voltage is sensed, it indicates the presence of a frequency within the given fraction. Thus, if receiver 11 has a 32 mc. bandwidth having an intermediate frequency with a center frequency of 100 mc. and oscillator 14 produces a frequency of 84 mc., then the output of mixer 13 can vary from 0–32 mc. If filter 15 passes 16–32 mc., then sensor 16 will detect any intermediate frequency from 100–116 mc.

The intermediate frequency is also fed to mixer 17 and mixed with the output of oscillator 18. The output of mixer 17 is filtered by band-pass filter 19 and then the filter output is sensed by voltage level sensor 20. If oscillator 18 produces a frequency of 100 mc. and filter 19 passes 8–16 mc., then sensor 20 can determine if the intermediate frequency is either between 84–92 mc. or between 108–116 mc.

The output of mixer 17 is also fed to filter 21 and mixer 23. If filter 21 is band-pass filter of 4–12 mc. then voltage level sensor 22 can determine if the intermediate frequency is either between 88–96 mc. or between 104–112 mc.

Mixer 23 receives the output of oscillator 24 and mixer 23. The output of mixer 23 is fed to band-pass filter 25. If oscillator 24 produces a frequency of 8 mc. and filter 25 passes a frequency of 2–6 mc., voltage level sensor 26 which is fed by filter 25 will determine if the intermediate frequency lies either between 82–90 mc., 94–98 mc., 102–106 mc. or 110–114 mc.

As an example, assume a signal is received such as the intermediate frequency is 103 mc., the output of mixer 13 would be 19 mc. and would pass filter 15 and, consequently, would be sensed by sensor 16. At the same time, the output of mixer 17 would be 3 mc.; however, this frequency would not be passed by filter 19. The input to filter 21 would be 3 mc. which would not be passed by filter 21. The output of mixer 23 would be 8 minus 3 mc. or 5 mc. and this signal would pass filter 25 and be sensed by sensor 26. Thus, the signals passed would activate sensor 16 and sensor 26 which is channel A and D, thereby giving the intermediate frequency to an accuracy of 2 mc. In binary form, 103 mc. would then be 1001.

At the same time, the intermediate frequency signal is fed to mixer 13, the video signal is delayed by delay circuit 27 and then a read out is performed of the sensors. The delay allows enough time for the binary form to be completed. The local oscillator within receiver 11 can be converted to binary form and then added to the intermediate frequency in binary form. This would give the actual radio frequency.

Figure 2:
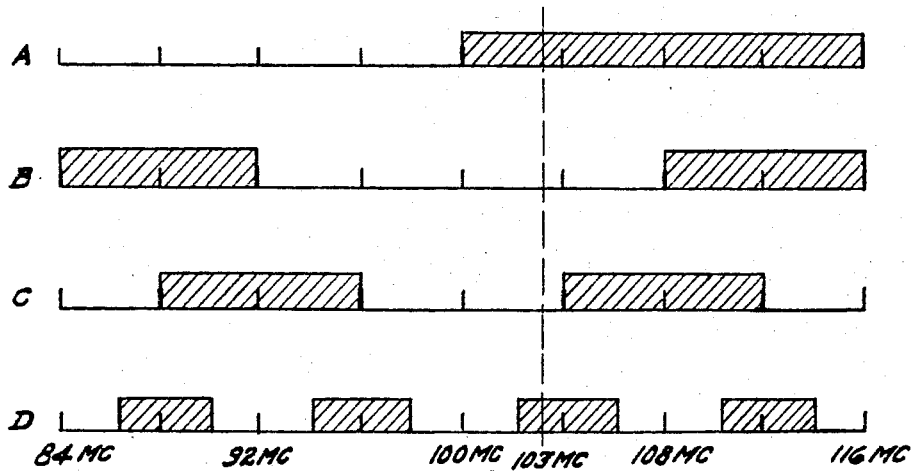
FIGURE 2 shows a chart indicating how an unknown frequency is determined.

FIGURE 2 shows in schematic form how the frequency is determined. It can be seen that additional channels would add greater accuracy. In the present example the accuracy is 2 mc.

Although the invention has been described with reference to a particular embodiment, it will be understood to those skilled in the art that the invention is capable of a variety of alternative embodiments within the spirit and scope of the appended claims.

I claim:
1. A system for determining the frequency of a received signal in a bandwidth receiver consisting of: a first oscillator having a frequency equal to the frequency at one end of said bandwidth; a first mixer connected to the receiver and to the first oscillator; a first filter connected to the first mixer allowing a first fraction of the bandwidth to pass, the first fraction being one-half of the output of the first mixer taken at one end thereof; a first voltage sensing means connected to the output of the first filter for indicating the presence of a signal within the first fraction; a second oscillator having a frequency equal to the center of the bandwidth; a second mixer connected to the receiver and to the second oscillator; a second filter connected to the second mixer allowing a second fraction of the bandwidth to pass, the second fraction being one-half of the second mixer output taken at one end thereof; a second voltage sensing means connected to the output of the second filter for indicating the presence of a signal within the second fraction; and means for comparing the states of the voltage sensing means to determine the frequency of the received signal.

2. A system for determining the frequency in a bandwidth receiver according to claim 1 which further consists of: a third filter connected to the second mixer allowing a third fraction of the bandwidth to pass, the third fraction being one-half of the frequency output of the second mixer taken at center portion thereof; a third oscillator having a frequency equal to the center frequency of the second mixer output; a third mixer connected to second mixer and to the third oscillator; a fourth filter allowing a fourth fraction of the bandwidth to pass, the fourth fraction being one-half of the frequency output of third mixer taken at the center portion thereof, and a third and fourth voltage sensing means connected to the outputs of the third and fourth filters.

References Cited
UNITED STATES PATENTS

| | | | |
|---|---|---|---|
| 2,999,205 | 9/1961 | Sichak et al. | 324—77 X |
| 3,189,820 | 6/1965 | Lowman | 324—77 X |
| 3,215,934 | 11/1965 | Sallen | 324—77 |

WALTER L. CARLSON, *Primary Examiner.*

P. F. WILLE, *Assistant Examiner.*